United States Patent
Muramatsu

(10) Patent No.: US 9,766,840 B2
(45) Date of Patent: Sep. 19, 2017

(54) NON-TRANSITORY COMPUTER READABLE MEDIUM, INFORMATION PROCESSING APPARATUS, AND INFORMATION PROCESSING METHOD SETTING CHARACTER RECOGNITION ACCURACY

(71) Applicant: FUJI XEROX CO., LTD., Tokyo (JP)

(72) Inventor: Shigeru Muramatsu, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/965,958

(22) Filed: Dec. 11, 2015

(65) Prior Publication Data
US 2016/0378409 A1    Dec. 29, 2016

(30) Foreign Application Priority Data
Jun. 29, 2015  (JP) .................................. 2015-129502

(51) Int. Cl.
| G06K 15/00 | (2006.01) |
| G06F 3/12 | (2006.01) |
| G06K 9/18 | (2006.01) |
| G06K 9/00 | (2006.01) |

(52) U.S. Cl.
CPC .......... *G06F 3/1222* (2013.01); *G06F 3/1238* (2013.01); *G06K 9/00993* (2013.01); *G06K 9/18* (2013.01); *G06K 2209/01* (2013.01)

(58) Field of Classification Search
CPC ....... G06F 3/1222; G06F 3/1238; G06K 9/18; H04N 163/105; H04N 163/168; H04N 163/0823
USPC .............. 358/1.1, 1.9, 1.13, 1.14, 1.15, 474; 705/39; 726/25
See application file for complete search history.

(56) References Cited

U.S. PATENT DOCUMENTS

| 2006/0195905 A1* | 8/2006 | Fudge ................... G06F 11/008 726/25 |
| 2006/0202012 A1* | 9/2006 | Grano ..................... G06Q 20/04 235/379 |
| 2012/0210388 A1* | 8/2012 | Kolishchak ........... G06F 21/552 726/1 |
| 2013/0325696 A1* | 12/2013 | Graves ................... G06Q 30/00 705/39 |
| 2015/0067867 A1* | 3/2015 | Blake .................. H04L 63/1425 726/25 |
| 2015/0288713 A1* | 10/2015 | Lawrence .............. G06Q 30/00 726/25 |

FOREIGN PATENT DOCUMENTS

| JP | 2000-295468 A | 10/2000 |
| JP | 2001-43316 A | 2/2001 |
| JP | 2010-33605 A | 2/2010 |

* cited by examiner

*Primary Examiner* — Gabriel Garcia
(74) *Attorney, Agent, or Firm* — Sughrue Mion, PLLC

(57) ABSTRACT

A non-transitory computer readable medium stores a program causing a computer to execute a process for information processing. The process includes determining a risk of information leakage by a user having indicated image processing, and controlling character recognition, the character recognition performing character recognition processing on an image subjected to the image processing, such that recognition accuracy of the character recognition processing that is performed on the image increases as the risk of information leakage determined in the determining increases.

8 Claims, 5 Drawing Sheets

FIG. 3

| USER "0001" | | | | | | |
|---|---|---|---|---|---|---|
| | JAN | FEB | MAR | APR | MAY | JUN |
| COPY | 20 | 15 | 5 | 20 | 25 | 20 |
| SCAN | 50 | 60 | 40 | 30 | 50 | 60 |
| FAX | 0 | 0 | 0 | 0 | 0 | 0 |
| PRINT | 100 | 150 | 120 | 80 | 1,500 | 1,500 |

FIG. 4

| STATISTICAL INFORMATION TYPE | PROCESSING TYPE | PERIOD | INCREASE RATE DETERMINATION THRESHOLD | TREND DEVIATION RATE |
|---|---|---|---|---|
| GENERAL | COPY | 3 months | 150% | 1 |
| GENERAL | PRINT | 3 months | 200% | 3 |
| ⋮ | ⋮ | ⋮ | ⋮ | ⋮ |
| SECURITY | COPY | 1 month | 150% | 3 |
| SECURITY | PRINT | 1 month | 200% | 5 |
| ⋮ | ⋮ | ⋮ | ⋮ | ⋮ |

FIG. 5

| USER "0001" | |
|---|---|
| ATTRIBUTE NAME | ATTRIBUTE VALUE |
| NAME | TARO FUJI |
| DEPARTMENT AND DIVISION | DEVELOPMENT DEPT. FIRST DEVELOPMENT DIV. |
| ⋮ | ⋮ |
| PLAN TO RESIGN | NO |
| PERSON UNDER SUSPICION | NO |
| TREND DEVIATION RATE | 3 |

FIG. 6

| PLANT TO RESIGN | PERSON UNDER SUSPICION | TREND DEVIATION RATE | RISK LEVEL |
|---|---|---|---|
| YES | YES | 3 – 5 | S |
| YES | NO | 0 – 3 | A |
| NO | YES | 3 – 5 | S |
| NO | NO | 3 – 5 | A |
| NO | NO | 0 – 3 | B |

FIG. 7

| RISK LEVEL | OCR PARAMETER |
|---|---|
| S | PARAMETER 1 |
| A | PARAMETER 2 |
| B | PARAMETER 3 | ered # NON-TRANSITORY COMPUTER READABLE MEDIUM, INFORMATION PROCESSING APPARATUS, AND INFORMATION PROCESSING METHOD SETTING CHARACTER RECOGNITION ACCURACY

CROSS-REFERENCE TO RELATED APPLICATIONS

This application is based on and claims priority under 35 USC 119 from Japanese Patent Application No. 2015-129502 filed Jun. 29, 2015.

BACKGROUND (i) Technical Field

The present invention relates to a non-transitory computer readable medium, an information processing apparatus, and an information processing method.

(ii) Related Art

Image processing apparatuses such as printers, scanners, facsimile machines, copiers, and multifunction apparatuses (apparatuses having the functions of a printer, a scanner, a copier, and so on) that process an image and output the processing result in various forms such as data, a printed material, and so on, have become indispensable in today's business environment.

Such an image processing apparatus is receiving attention as a route for leakage of information from organizations such as companies. A conventional countermeasure against information leakage from an image processing apparatus is to store an image processed by an image processing apparatus as a log image, together with information on the user who has issued an instruction for the processing, and log information such as the time and date of the processing.

Further, the log image is monitored so as to determine whether a document that is printed, copied, or transmitted by facsimile is likely to be a confidential document. In this monitoring process, optical character recognition (OCR) processing is performed on the log image, and a determination is made as to whether the resulting text data includes a phrase indicating classification as secret, such as "internal use only", or a keyword to be monitored, such as a development code of a new product.

There are various systems (for examples, programs) for OCR processing with different levels of recognition accuracy (for example, recognition error rates). Further, in some cases, even in the same OCR system, the recognition accuracy may be changed by, for example, changing the parameter to be used for the processing. Generally, in any case, as the recognition accuracy is increased, the calculation cost required for OCR processing (for example, the time required for processing) increases.

Accordingly, if a monitoring system that needs to process a large amount of log images performs high-accuracy OCR processing on all the log images in order to realize high-accuracy monitoring, the processing load imposed on the system is greatly increased, or the cost needed to satisfy the hardware requirements of the system is greatly increased.

SUMMARY

According to an aspect of the invention, there is provided a non-transitory computer readable medium storing a program causing a computer to execute a process for information processing, the process including: determining a risk of information leakage by a user having indicated image processing; and controlling character recognition, the character recognition performing character recognition processing on an image subjected to the image processing, such that recognition accuracy of the character recognition processing that is performed on the image increases as the risk of information leakage determined in the determining increases.

BRIEF DESCRIPTION OF THE DRAWINGS

An exemplary embodiment of the present invention will be described in detail based on the following figures, wherein:

FIG. 3 illustrates an example of general statistical information;

FIG. 4 illustrates an example of a determination rule table used for determining a trend deviation rate;

FIG. 5 illustrates an example of user information stored in a user information database;

FIG. 6 illustrates an example of a determination rule table used for determining a risk level;

FIG. 7 illustrates an example of a table used for determining an OCR parameter from a risk level;

DETAILED DESCRIPTION

Figure 1:
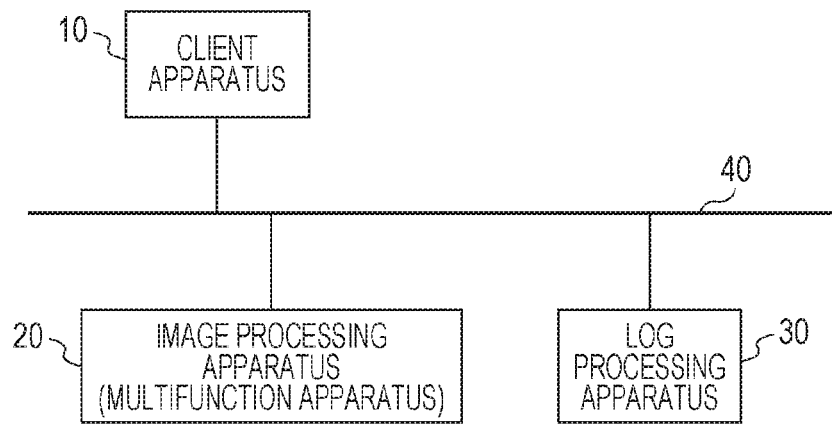
FIG. 1 illustrates an example of a system to which control according to an exemplary embodiment is applied.

An example of the system configuration according to an exemplary embodiment will be described with reference to FIG. 1.

This system includes a client apparatus 10, an image processing apparatus 20, and a log processing apparatus 30. These apparatuses 10 through 30 are connected to a network 40 such as a local area network.

The client apparatus 10 is an apparatus that issues an operation instruction to the image processing apparatus 20 in response to an instruction from the user. The operation instruction is, for example, an instruction for printing a document. The client apparatus 10 is configured as a personal computer (PC), for example.

The image processing apparatus 20 is an apparatus that performs image processing that is the subject of monitoring in the system according to this exemplary embodiment. For instance, the image processing apparatus 20 may be a multifunction apparatus having the functions of, for example, a printer, a scanner, a copier, a facsimile machine, and the like. In this case, "image processing" includes processing for printing an image on a medium, processing for reading an image from a document and generating electronic data of the image, processing for copying an image read from a document to a medium, processing for transmitting an image read from a document by facsimile. Note that the "image processing" that is the subject of monitoring in this exemplary embodiment is not limited to printing an image on a physical medium (such as paper) or processing that involves reading an image from a physical medium such as a paper document. For example, any processing that handles image data, such as processing for facsimile transmission of image data input from the client apparatus 10 may be the subject of monitoring. The image processing apparatus 20 may be one that outputs the result of image processing as electronic data, and therefore does not necessarily have to have a function for printing on a medium (such as paper). Further, the image processing apparatus may be one that receives the subject of processing as electronic data, and therefore does not necessarily have to have a function for optically reading a document. The image processing apparatus 20 includes either or both of an interface that receives an image processing instruction (for example, print instruction) from the client apparatus 10 operated by the user and a user interface (UI) that receives an instruction (for example, copy instruction) directly from the user.

The log processing apparatus 30 is an apparatus that records a log (processing history) of image processing performed by the image processing apparatus 20. In particular, in this exemplary embodiment, the log processing apparatus 30 records an image subjected to image processing performed by the image processing apparatus 20 as a "log image". The image subjected to image processing may be recorded at any stage. That is, the image to be recorded may be any of an image input for the image processing, an image output from the image processing, and an image at a predetermined stage of processing. The stage at which the image is recorded as a log image may be determined in advance. The stage at which the image is recorded as a log image may be determined for each type of image processing.

Further, the log processing apparatus 30 performs optical character recognition (OCR) processing on the log image and analyzes text data resulting from the OCR processing, thereby monitoring the risk of information leakage in image processing. In this monitoring, the log processing apparatus 30 searches for, for example, predetermined keywords to be monitored (for example, words representing confidential levels such as "confidential" and "for internal use only", a development code of a product under development, and the like) from the text data resulting from the OCR processing, and records a keyword found by the search in association with a log image thereof. Further, the log processing apparatus 30 may record, in association with the log image, other attribute information items of the image processing such as the user ID of the user who has issued an instruction for image processing, the type of image processing, the time and date of execution of the image processing.

As will be described in detail below, the log processing apparatus 30 according to this exemplary embodiment controls the accuracy of OCR in accordance with the level of risk of information leakage by the user. That is, the log processing apparatus 30 increases the OCR accuracy as the risk of information leakage increases, thereby reducing the number of failed detections of keywords to be monitored.

Upon performing image processing in response to an instruction from the user, the image processing apparatus 20 generates a log image of an image subjected to the image processing, such that the log processing apparatus 30 stores the log image and perform monitoring. Then, the image processing apparatus 20 transmits to the log processing apparatus 30 the log image together with other predetermined log information items to be recorded (for example, the user ID of the user who has issued the instruction, the time and date of execution of the image processing, and so on). Note that the data format of a log image is not particularly limited, and may be selected in accordance with the system requirements. For example, a log image may be a compressed image data that is obtained by compressing an image subjected to image processing, using a predetermined compression method.

Note that although there is only one image processing apparatus 20 in FIG. 1, there may be plural image processing apparatuses 20 in the system. In this case, the log processing apparatus 30 records log information of image processing performed by the plural image processing apparatuses 20 in the system.

Figure 2:
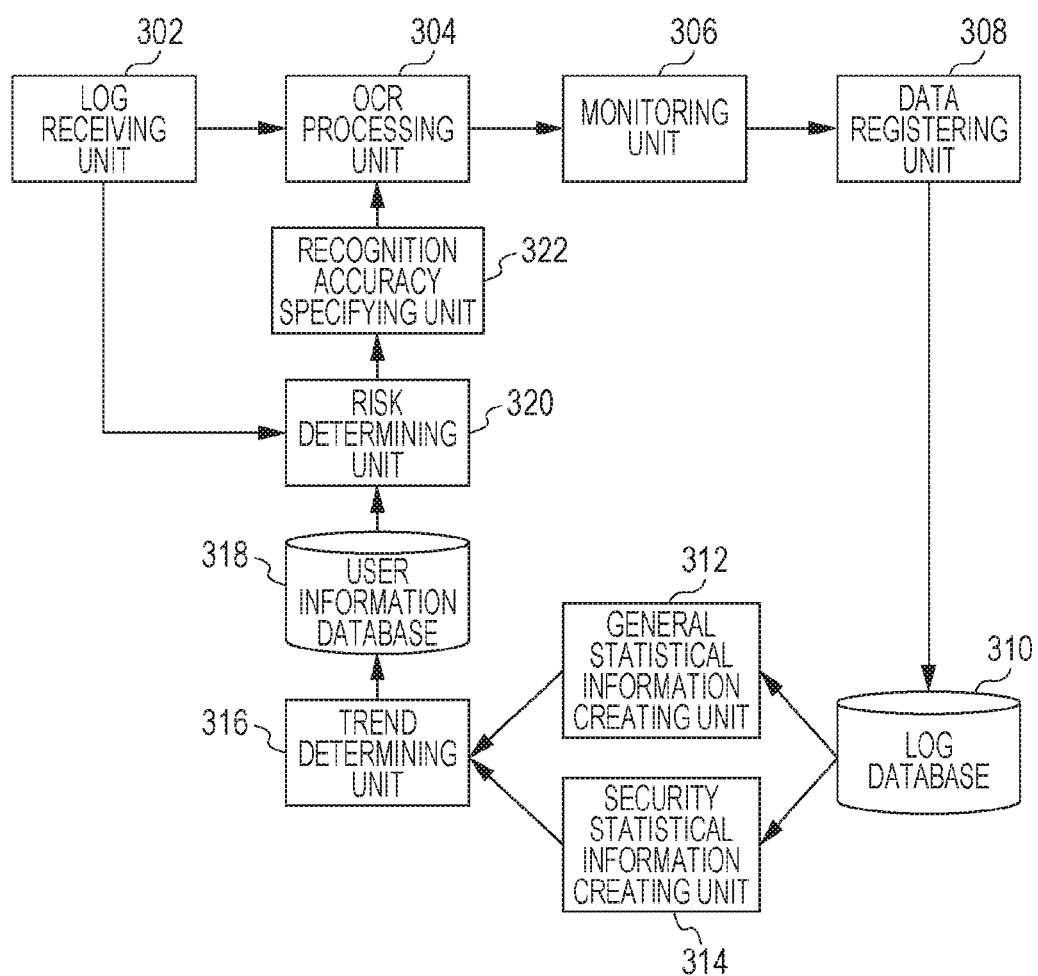
FIG. 2 illustrates an example of the functional configuration of a log processing apparatus according to the exemplary embodiment.

The log processing apparatus 30 will be described in greater detail with reference to FIG. 2.

A log receiving unit 302 of the log processing apparatus 30 receives log information (a log image and other log information items (if any)) from the image processing apparatus 20. An OCR processing unit 304 performs OCR processing on the log image received by the log receiving unit 302, and generates text data representing the character strings included in the log image. A monitoring unit 306 searches for keywords to be monitored, from the text data that is input from the OCR processing unit 304. For example, the monitoring unit 306 determines, for each keyword to be monitored, whether that keyword is included in the text data. A data registering unit 308 registers the log image and other log information items received by the log receiving unit 302 and the result of monitoring by the monitoring unit 306 (for example, a list of keywords found in the text data) in a log database 310. The log database 310 is a database that stores log information including log images. For example, if leakage of a document is found, a log image similar to the leaked document may be searched for from the log images stored in the log database 310, for example, and thereby it is possible to find information (for example, the user who has issued an instruction for processing an image corresponding to the log image, the time and date of the processing, and the like) that helps to identify the source of the leakage of the document. Note that the functions of each of the monitoring unit 306, the data registering unit 308, and the log database 310 are not special features of this exemplary embodiment, and therefore only one example of the functions of each is given herein. Each of the monitoring unit 306, the data registering unit 308, and the log database 310 may have the same functions as those of a conventional element of the same type.

A general statistical information creating unit 312 analyzes the log information stored in the log database 310 and creates, for each user, statistical information on image processing performed by that user. While a security statistical information creating unit 314 (described below) creates statistical information on documents that are processed by the image processing apparatus 20 and are related to information security (that is, documents from whose log images keywords to be monitored are detected), the general statistical information creating unit 312 creates statistical information (referred to as "general statistical information") on the log of image processing performed on all the documents by the image processing apparatus 20, without being limited to such documents related to information security.

FIG. 3 illustrates an example of general statistical information created by the general statistical information creating unit 312. In FIG. 3, general statistical information on one user (for example, the user with the user ID "0001") is illustrated. The illustrated general statistical information represents the frequency (the number of times) of various types of image processing performed by the user using the image processing apparatus 20 (or a group of image processing apparatuses 20 in the system) in each month, on a per image processing type basis (for example, copy, scan, and so on).

As mentioned above, the security statistical information creating unit 314 creates statistical information (referred to as "security statistical information") from a group of pieces of log information of image processing performed on documents related to information security. Similar to the information illustrated in FIG. 3, the security statistical information represents the monthly frequency of image processing on a per image processing type basis. The frequency herein is the frequency of image processing performed on documents from whose log images any of keywords to be monitored is detected, for example. That is, if, for example, any of keywords to be monitored is detected in a log image in 3 out of 20 copy operations performed by the user "0001" in January, then the value in the "COPY" field for January in the security statistical information for the user "0001" is "3".

A trend determining unit 316 determines, for each user, a trend deviation rate of each of the items of the statistical information, on the basis of general statistical information and security statistical information created for that user by the general statistical information creating unit 312 and the security statistical information creating unit 314, respectively. The trend deviation rate is the rate of deviation of the usage of the image processing apparatus 20 by the user from the general trend (that is, the normal trend of usage by the user). The trend determining unit 316 periodically determines the trend deviation rate of each user, for example, and registers the determined trend deviation rate in a user information database 318.

FIG. 4 illustrates an example of determination rules used by the trend determining unit 316 for determining the trend deviation rate. The illustrated determination rules define, for each combination of the type of statistical information ("GENERAL" or "SECURITY") and the type of image processing, a combination of the length of the period specified as a unit of determination, the determination threshold, and the value of the trend deviation rate. For example, as for the rule for the "COPY" in general statistical information, if the rate of increase in the total of the frequency of "COPY" during the current determination period (during the last 3 months from the current date) compared to the previous 3-month determination period is 150% (that is, 1.5 times) or greater, the value of the trend deviation rate is determined to be "1". As for the rule for the "PRINT" in security statistical information, if the rate of increase in the total of the frequency of "PRINT" (that is, the number of times a document including any of keywords to be monitored is printed) during the current determination period (during the last 1 month) compared to the previous 1-month determination period is 200% (that is, 2 times) or greater, the value of the trend deviation rate is determined to be "5". In this example, the value of the trend deviation rate is an integer from 0 to 5, and a greater value indicates a greater deviation between the previous period and the current period. As the trend deviation rate increases, it is more likely that the user is behaving differently from usual, and therefore the risk of information leakage is assumed to increase. In the example of FIG. 4, the period specified as a unit of determination in the determination rules related to the security statistical information is shorter than that in the determination rules related to the general statistical information. This is because consideration is given to, for example, the fact that the user does not very often cause the image processing apparatus 20 to process a document including a keyword to be monitored, and the fact that if there appears a tendency for the user to often cause the image processing apparatus 20 to process such a document, this tendency needs to be detected as soon as possible.

Note that the determination rules illustrated in FIG. 4 are merely one example, and other rules may be used in addition to or in place of these rules. Examples of other rules include a rule that determines a higher value of the trend deviation rate for a higher rate of increase in the frequency of image processing during the current period compared to the same time of the previous year (or the previous few years), in view of the seasonal variation of the behavior of the user.

The user information database 318 is a database that holds information on each user that helps leakage risk determination by a risk determining unit 320 described below. FIG. 5 illustrates an example of records of individual users held in the user information database 318. This example is a record of the user with the user ID "0001". The record includes not only items such as the name of the user and the department and the division to which the user belongs, but also items "PLAN TO RESIGN", "PERSON UNDER SUSPICION", and "TREND DEVIATION RATE". The item "PLAN TO RESIGN" indicates whether the user is planning to resign. In the illustrated example, the value of this attribute is "NO" (not planning to resign). The value of the item "PLAN TO RESIGN" may be obtained from, for example, personnel information database (not illustrated) from the organization that is operating this system. The item "PERSON UNDER SUSPICION" indicates whether the user is a person to watch out for in terms of information leakage. The value of this item may be set by the information system administrator on the basis of knowledge of the past behavior of the user and the like. The "TREND DEVIATION RATE" is a value determined for the user by the trend determining unit 316.

Referring back to FIG. 2, the risk determining unit 320 determines the risk of information leakage by the user who has issued an instruction for image processing for which a log image received by the log receiving unit 302 is generated. This determination is made on the basis of the values of the three items, "PLAN TO RESIGN", "PERSON UNDER SUSPICION", and "TREND DEVIATION RATE" of the user registered in the user information database 318.

An example of rules for this determination is illustrated in FIG. 6. In this example, there are three levels, S, A, and B, as the risk levels representing the degree of the risk of information leakage. Then, the rules define, for each combination of the values of the three items, "PLAN TO RESIGN", "PERSON UNDER SUSPICION", and "TREND DEVIATION RATE", a risk level corresponding to that combination. Each row in the table of FIG. 6 indicates one determination rule. In the case where the determination rules illustrated in FIG. 6 are used, for example, the user who is planning to resign, is under suspicion, and has a trend deviation rate of 3 or greater is determined to be at a risk level of S.

The risk determining unit 320 reports the value of the determined risk level to a recognition accuracy specifying unit 322.

The recognition accuracy specifying unit 322 instructs the OCR processing unit 304 to perform OCR processing with a character recognition accuracy corresponding to the reported risk level. In one example, as illustrated in FIG. 7, the recognition accuracy specifying unit 322 has a table indicating, for each risk level, an operating parameter for the OCR processing unit 304 to achieve the recognition accuracy corresponding to that risk level. In this example, the recognition accuracy specifying unit 322 obtains an OCR parameter corresponding to the reported risk level, and instructs the OCR processing unit 304 to perform OCR processing in accordance with the obtained OCR parameter. The OCR parameter is not limited to parameters for processing of recognizing characters from an image, and may include parameters for pre-processing (for example, binarization processing, a noise removal process, or the like) that coverts an image of interest into an image suitable for OCR processing.

The OCR processing unit 304 performs OCR processing on a log image with the accuracy (OCR parameter) specified by the recognition accuracy specifying unit 322.

Figure 8:
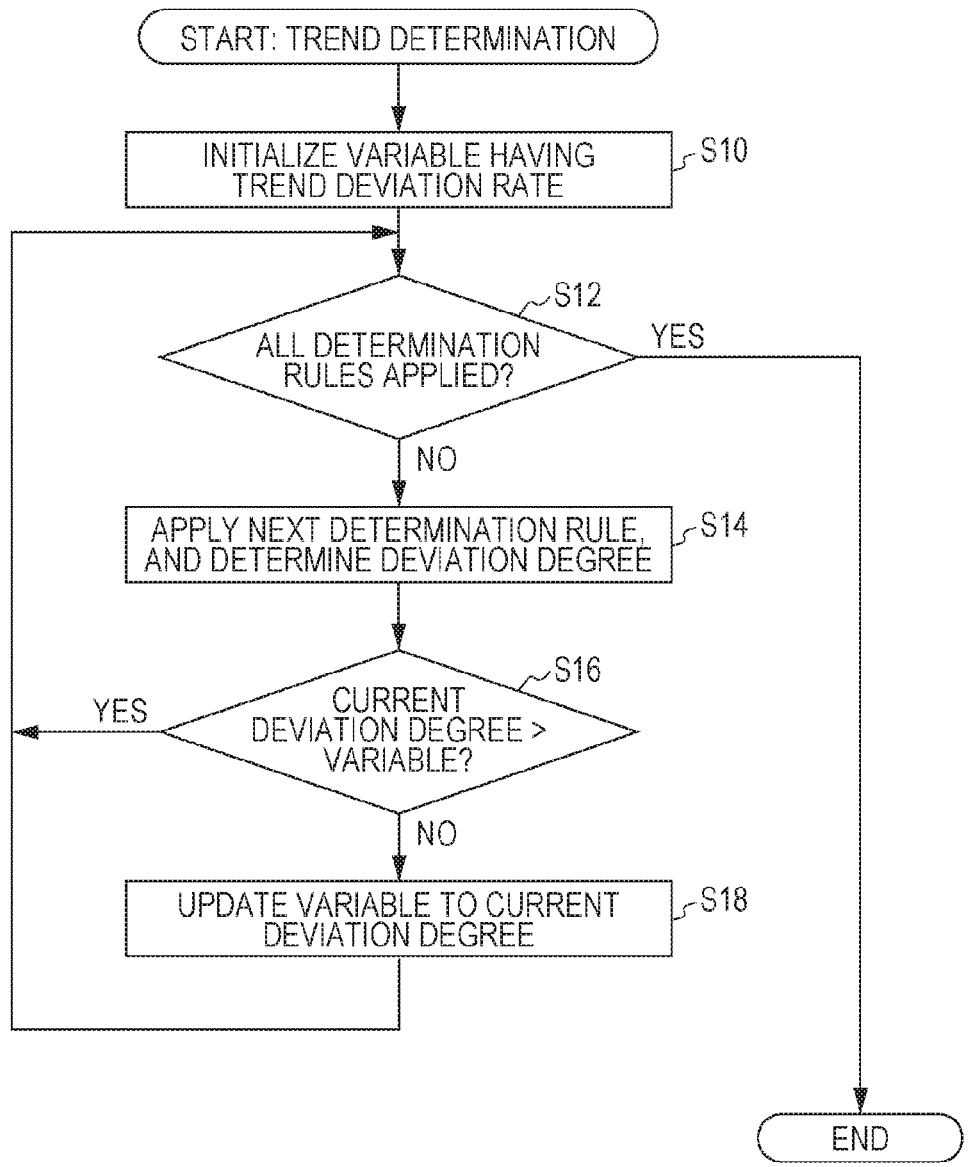
FIG. 8 illustrates an example of the procedure of a trend determination process.

Next, an example of processing procedure that is executed by the log processing apparatus 30 each time the log receiving unit 302 receives a log image from the image processing apparatus 20 will be described with reference to FIG. 8.

According to this procedure, when a new log image is input, the trend determining unit 316 initializes a variable having the highest value of the trend deviation rate of the user to "0" (S10). Then, the trend determining unit 316 determines whether all the rules in the determination rule table (see FIG. 4) are already applied to the user (S12). If a determination is made that there are unapplied determination rules, one of the unapplied rules is applied to the statistical information on the user, and the trend deviation rate of the user with respect to that rule is obtained (S14). Then, the currently obtained value of the trend deviation rate is compared with the variable (S16), and if the current value is greater than the variable, the value of the variable is replaced with the current value (S18). Then, the process returns to step S12. If in step S16 the current value is equal to or less than the value of the variable, the process skips step S18 and returns to step S12. With the process described above, the highest trend deviation rate among those obtained by applying all the determination rules in the determination rule table is obtained as the trend deviation rate of the user.

Figure 9:
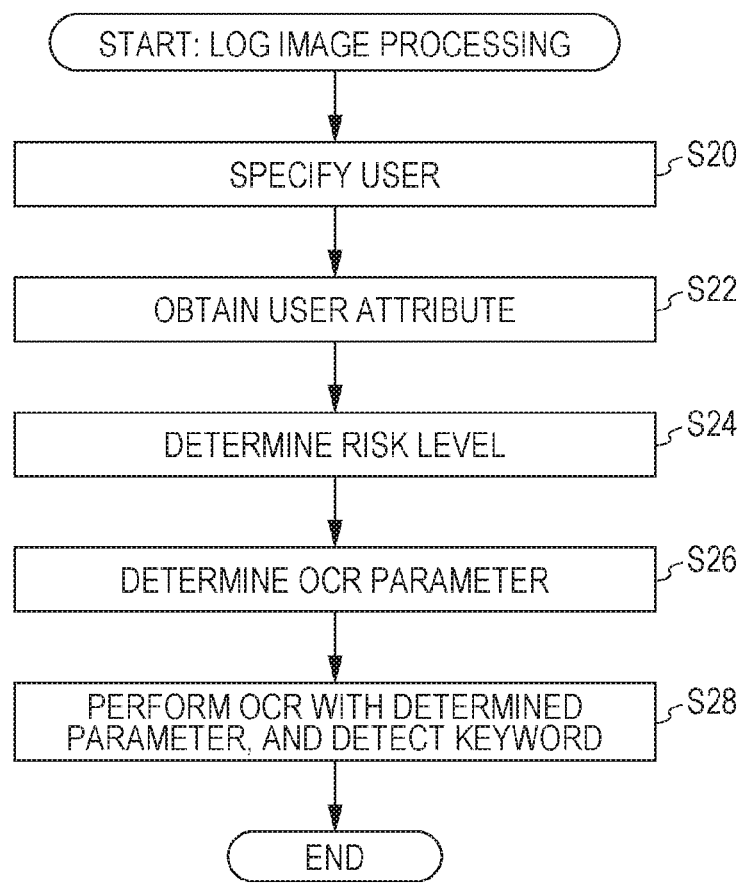
FIG. 9 illustrates an example of the procedure for the log processing apparatus to process a log image.

Next, an example of processing performed by the trend determining unit 316 will be described with reference to FIG. 9. The procedure of FIG. 9 is performed when the log receiving unit 302 receives a new log image. According to this procedure, the risk determining unit 320 specifies, from a user ID included in the log information received together with the log image, a user who has issued an instruction for image processing for which the log image is generated (S20). Then, the risk determining unit 320 searches for user attributes corresponding to the user ID from the user information database 318 (S22), and determines the risk level of the user by applying the information on the user attributes to the determination rules for determining the risk level (see FIG. 6) (S24). Then, the recognition accuracy specifying unit 322 determines an OCR parameter corresponding to the risk level determined in step S24, and reports the determined OCR parameter to the OCR processing unit 304 (S26). The OCR processing unit 304 performs OCR processing on the log image received by the log receiving unit 302 in accordance with the OCR parameter, and the monitoring unit 306 searches for the keywords to be monitored from the resulting text data (S28). The data registering unit 308 registers information such as the log image received by the log receiving unit 302 and information on the result of monitoring by the monitoring unit 306 in the log database 310.

In this exemplary embodiment, as the risk of information leakage by the user who has issued an instruction for image processing increases, the accuracy of character recognition processing that is performed on a log image subjected to the image processing is increased. Therefore, the risk that the keywords to be monitored are overlooked due to recognition errors is reduced.

It would be ideal to perform character recognition processing on all the log images with the highest accuracy. In this case, however, since there are a huge number of log images to be processed, the OCR processing unit 304 is required to have a very high processing performance, which results in high cost of the system. On the other hand, in this exemplary embodiment, since high-accuracy character recognition with high processing load is not applied to the user at low risk of information leakage, the system is not required to have a very high processing performance.

In the above example, the accuracy of OCR processing is changed by changing the processing parameter for a single OCR processing unit 304. However, this is merely one example. As another example, there may be plural OCR processing units 304 with different levels of character recognition accuracy such that one of the OCR processing units 304 corresponding to the determined risk level of the user may be selected and used.

The log processing apparatus 30 described above is realized by causing a general-purpose computer to execute a program describing the processing to be performed by the each of the functional modules of the log processing apparatus 30. The computer has a circuit configuration in which, as hardware, for example, a microprocessor such as a CPU, memories (first memories), such as a random access memory (RAM) and a read only memory (ROM), an HDD controller that controls a hard disk drive (HDD), various input/output (I/O) interfaces, a network interface that controls connection with a network such as a local area network, and the like are connected to one another via, for example, a bus. A disc drive that is used for reading from and/or writing to portable disc recording media such as CDs and DVDs, a memory reader-writer for reading from and/or writing to portable non-volatile recording media of various standards such as flash memories, and the like may be connected to the bus via, for example, an I/O interface. A program describing the content of processing to be performed by each of the functional modules described above is stored in a fixed storage device such as a hard disk drive, via a recording medium such as a CD or a DVD or via a communication unit such as a network, and is installed in a computer. The program stored in the fixed storage device is read to the RAM and executed by the microprocessor such as a CPU, so that the group of the functional modules described above is realized.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for information processing, the process comprising:

determining a risk of information leakage by a user having indicated image processing;

determining an increase in the risk of information leakage by at least one of an indication of a plan of the user to resign from an employer, an indication that the user is under suspicion by the employer and a comparison of a previous risk of information leakage, determined prior to determining the risk of information leakage; and controlling character recognition, the character recognition performing character recognition processing on an image subjected to the image processing, such that recognition accuracy of the character recognition processing is increased in response to the increase in the risk of information leakage, wherein the determining the increase in the risk of information leakage further includes determining, on a basis of statistics on log information of the image processing indicated by the user, a rate of deviation of a trend of image processing indicated by the user during a most recent period prior to a point of time of the determination from a trend of image processing indicated during a past normal period, and determining the risk of information leakage by the user on the basis of the determined rate of deviation.

2. The non-transitory computer readable medium according to claim 1, wherein the statistics of log information is in monthly increments.

3. The non-transitory computer readable medium according to claim 1, wherein the statistics of log information comprises first statistics for general image processing by the user, the general image processing performed on first image data not comprising confidential information, and the statistics of log information further comprising second statistics for confidential image processing by the user, the confidential image processing performed on second image data comprising the confidential information.

4. The non-transitory computer readable medium according to claim 1, wherein the increase of recognition accuracy is directly proportional to the increase of the risk of information leakage to a higher, predetermined level of risk of information leakage.

5. The non-transitory computer readable medium according to claim 1, wherein determining the risk of information leakage is based on user information of the user having indicated image processing, the user information being stored in a user information database.

6. An information processing apparatus comprising:
at least one hardware processor configured to implement:
determining a risk of information leakage by a user having indicated image processing;
determining an increase in the risk of information leakage by at least one of an indication of a plan of the user to resign from an employer, an indication that the user is under suspicion by the employer and a comparison of a previous risk of information leakage, determined prior to determining the risk of information leakage; and
controlling a character recognition, the character recognition performing character recognition processing on an image subjected to the image processing, such that recognition accuracy of the character recognition processing is increased in response to the increase in the risk of information leakage,
wherein the determining the increase in the risk of information leakage further includes determining, on a basis of statistics on log information of the image processing indicated by the user, a rate of deviation of a trend of image processing indicated by the user during a most recent period prior to a point of time of the determination from a trend of image processing indicated during a past normal period, and determining the risk of information leakage by the user on the basis of the determined rate of deviation.

7. An information processing method comprising:
determining a risk of information leakage by a user having indicated image processing;
determining an increase in the risk of information leakage by at least one of an indication of a plan of the user to resign from an employer, an indication that the user is under suspicion by the employer and a comparison of a previous risk of information leakage, determined prior to determining the risk of information leakage; and
controlling a character recognition, the character recognition performing character recognition processing on an image subjected to the image processing, such that recognition accuracy of the character recognition processing is increased in response to the increase in the risk of information leakage,
wherein the determining the increase in the risk of information leakage further includes determining, on a basis of statistics on log information of the image processing indicated by the user, a rate of deviation of a trend of image processing indicated by the user during a most recent period prior to a point of time of the determination from a trend of image processing indicated during a past normal period, and determining the risk of information leakage by the user on the basis of the determined rate of deviation.

8. A non-transitory computer readable medium storing a program causing a computer to execute a process for information processing, the process comprising:
determining a risk of information leakage by a user having indicated image processing;
determining an increase in the risk of information leakage including determining, on a basis of statistics on log information of the image processing indicated by the user, a rate of deviation of a trend of image processing indicated by the user during a most recent period prior to a point of time of the determination from a trend of image processing indicated during a past normal period, and determining the risk of information leakage by the user on the basis of the determined rate of deviation; and
controlling character recognition, the character recognition performing character recognition processing on an image subjected to the image processing, such that recognition accuracy of the character recognition processing is increased in response to the increase in the risk of information leakage.

* * * * *